(12) United States Patent
Ho et al.

(10) Patent No.: US 8,292,492 B2
(45) Date of Patent: Oct. 23, 2012

(54) AIRFOIL-SHAPED MICRO-MIXERS FOR REDUCING FOULING ON MEMBRANE SURFACES

(75) Inventors: Clifford K. Ho, Albuquerque, NM (US); Susan J. Altman, Cedar Crest, NM (US); Paul G. Clem, Albuquerque, NM (US); Michael Hibbs, Albuquerque, NM (US); Adam W. Cook, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 979 days.

(21) Appl. No.: 12/268,542

(22) Filed: Nov. 11, 2008

(65) Prior Publication Data

US 2010/0118642 A1    May 13, 2010

(51) Int. Cl.
*B01F 13/00* (2006.01)

(52) U.S. Cl. .......................... 366/341; 366/336; 366/338
(58) Field of Classification Search .................. 366/336, 366/338, 341
See application file for complete search history.

(56) References Cited

U.S. PATENT DOCUMENTS

2007/0017633 A1 * 1/2007 Tonkovich et al. ........... 156/300
* cited by examiner

*Primary Examiner* — Yogendra Gupta
*Assistant Examiner* — John Robitaille
(74) *Attorney, Agent, or Firm* — Daniel J. Jenkins

(57) ABSTRACT

An array of airfoil-shaped micro-mixers that enhances fluid mixing within permeable membrane channels, such as used in reverse-osmosis filtration units, while minimizing additional pressure drop. The enhanced mixing reduces fouling of the membrane surfaces. The airfoil-shaped micro-mixer can also be coated with or comprised of biofouling-resistant (biocidal/germicidal) ingredients.

23 Claims, 14 Drawing Sheets

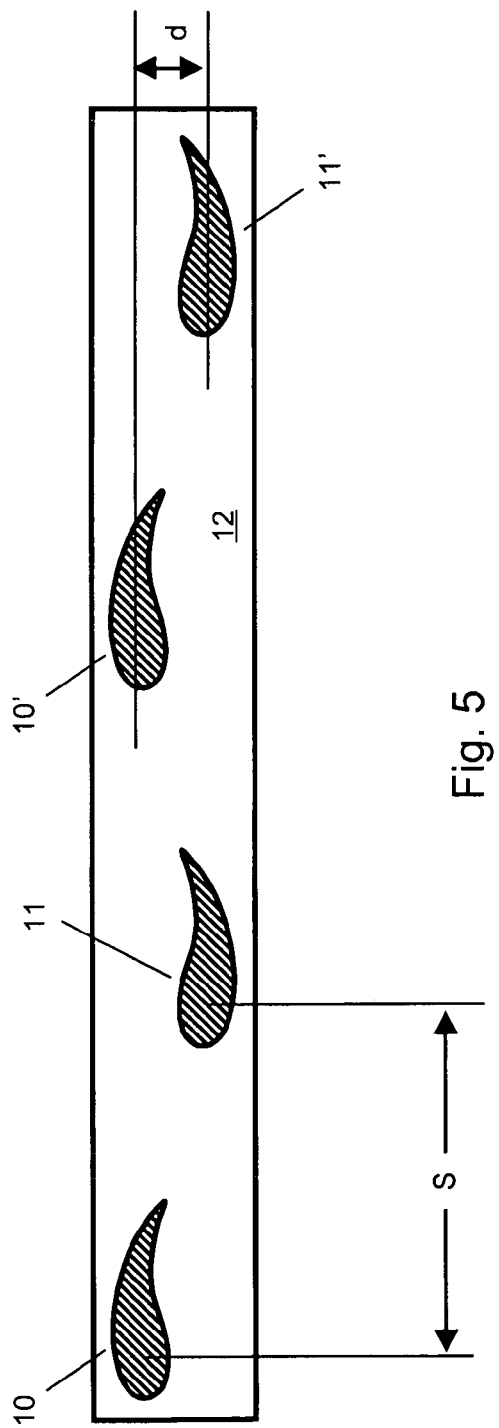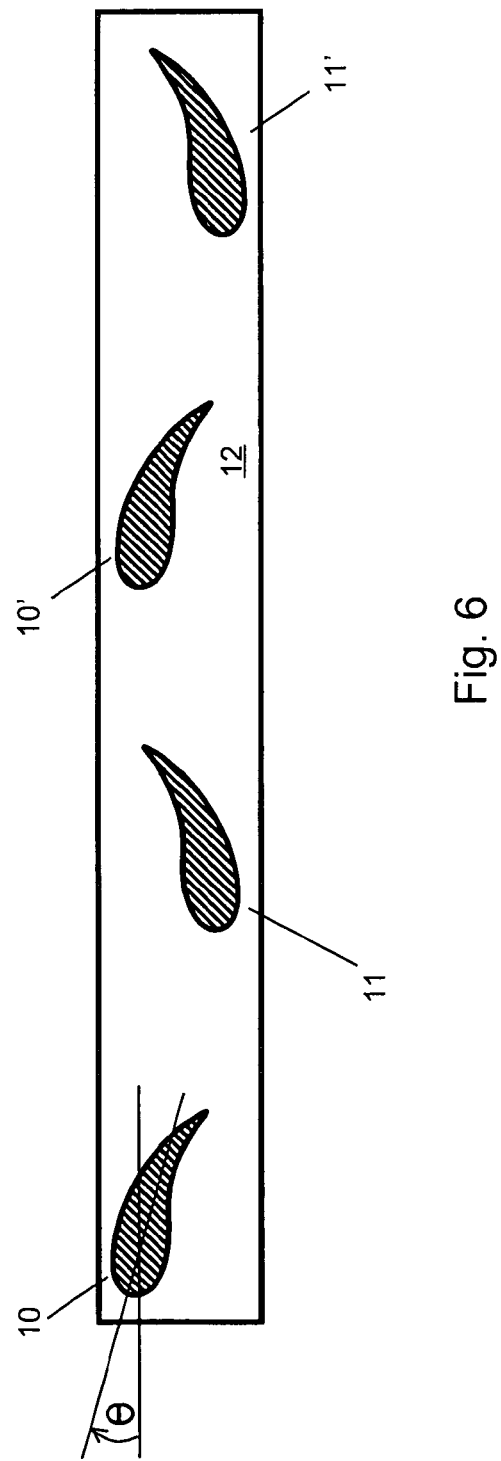

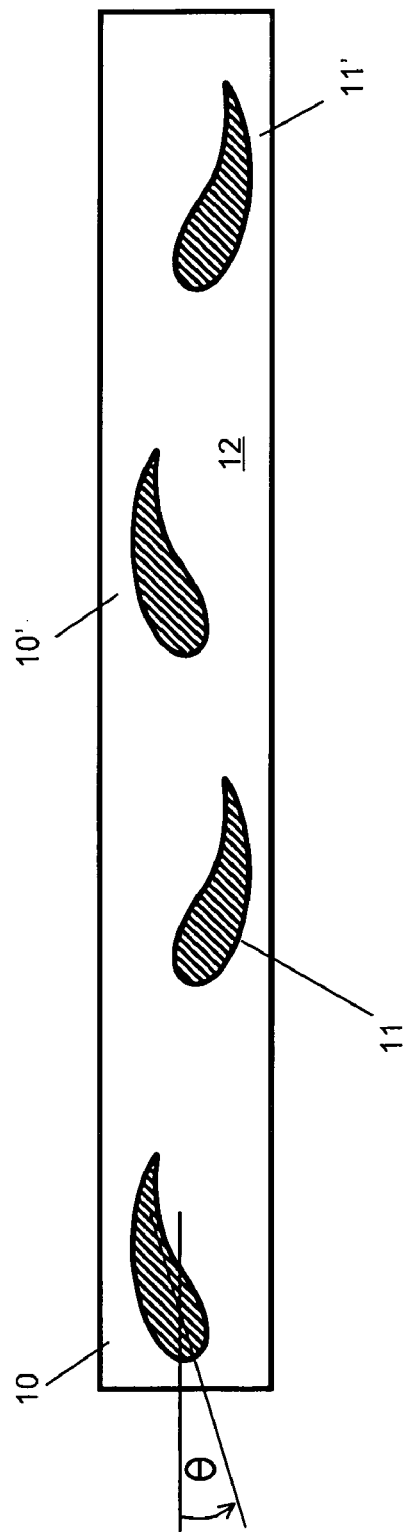
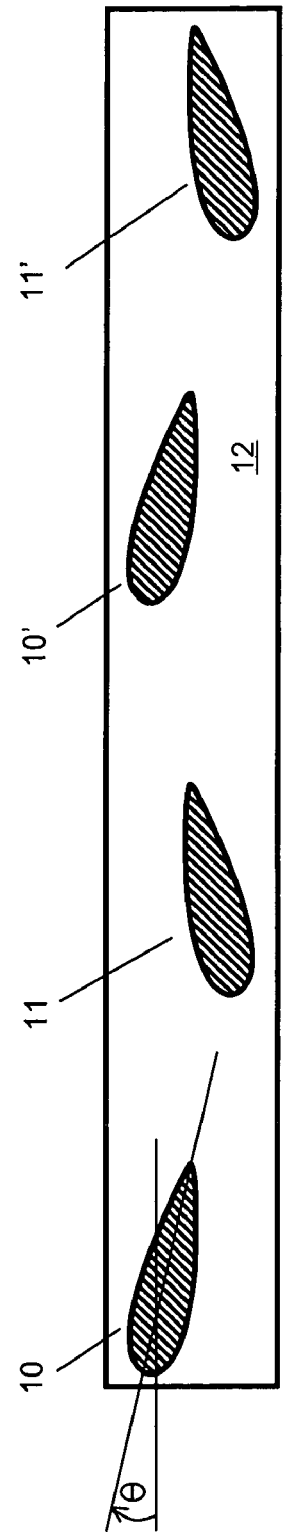

US 8,292,492 B2

AIRFOIL-SHAPED MICRO-MIXERS FOR REDUCING FOULING ON MEMBRANE SURFACES

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

The present invention relates generally to a method and apparatus for reducing fouling on permeable membrane surfaces, such as Reverse Osmosis (RO) desalination membranes.

Membrane-based separation processes, such as reverse osmosis and ultra- or nano-filtration, are commonly used in industrial applications, such as: desalination, wastewater treatment, and power generation. The major problems associated with membrane-based separation processes include fouling from organic and inorganic contaminants and high pressure loss, which decrease the efficiency of the filtration, while increasing operation costs.

Localized fouling from mineral deposition and biofilms have been correlated with "dead zones" of low flow and low mixing. This lack of fluid scouring allows biofilms to grow in these regions. The small channel size in a typical commercial spiral-wound RO membrane module (typical channel height ranges from 0.1 to a few mm's), promotes laminar flow, due to the low Reynolds number. Laminar flow minimizes mixing from the spontaneous fluctuation in velocity that would be present in turbulent flow in larger channels and higher velocities. Previous approaches for increasing local fluid mixing in these micro-channels include inserting layers of cylindrically shaped filaments in a ladder-type or net-type micro-mixer arrangement. However, these designs suffer from increased pressure drop along the channel, and from regions of low flow and stagnation directly downstream of the cylindrical insert.

What is needed is a micro-mixer design that increases local fluid mixing within these micro-channels to increase the scouring effect on the membrane surfaces, while minimizing the increase in pressure drop; and, while minimizing regions of stagnant flow directly downstream of the micro-mixer.

Against this background, the present invention was developed.

SUMMARY OF THE INVENTION

An array of airfoil-shaped micro-mixers that enhances fluid mixing within permeable membrane channels, such as used in reverse-osmosis filtration units, while minimizing additional pressure drop. The enhanced mixing reduces fouling of the membrane surfaces. The airfoil-shaped micro-mixer can also be coated with or comprised of biofouling-resistant (biocidal/germicidal) ingredients.

BRIEF DESCRIPTION OF THE DRAWINGS

The accompanying drawings, which are incorporated in and form part of the specification, illustrate various examples of the present invention and, together with the detailed description, serve to explain the principles of the invention.

FIG. 5 shows a schematic top view of a staggered array of airfoil-shaped micro-mixers disposed on a substrate.

FIG. 6 shows a schematic top view of a staggered array of airfoil-shaped micro-mixers disposed on a substrate.

FIG. 7 shows a schematic top view of a staggered array of airfoil-shaped micro-mixers disposed on a substrate.

FIG. 9 shows a schematic top view of a staggered array of airfoil-shaped micro-mixers disposed on a substrate.

DETAILED DESCRIPTION OF THE INVENTION

Figure 1:
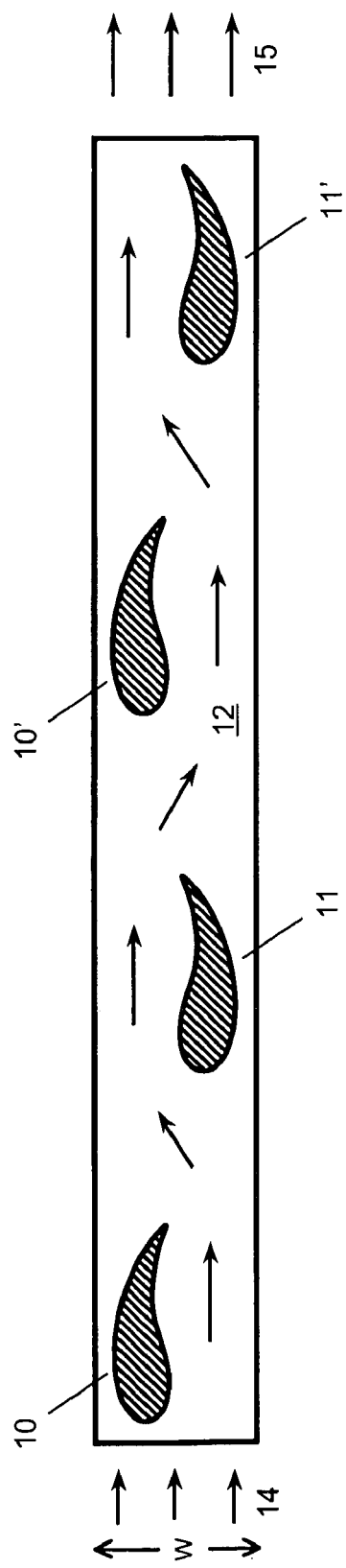
FIG. 1 shows a schematic top view of a staggered array of alternating airfoil-shaped micro-mixers disposed on a substrate.
Figure 2:
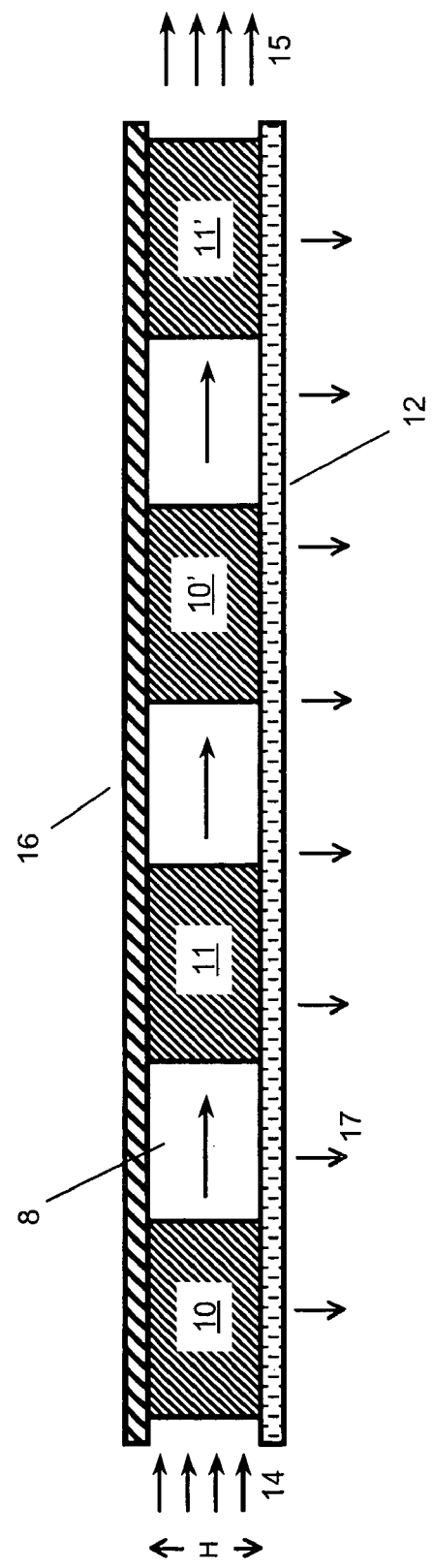
FIG. 2 shows a schematic side view of a staggered array of alternating airfoil-shaped micro-mixers within a micro-channel.

FIG. 1 shows a schematic top view of a staggered array of alternating airfoil-shaped micro-mixers 10, 10', 11, 11' disposed on a membrane substrate 12. FIG. 2 shows a side view of the same arrangement. Micro-channel 8 has channel height=H, and is bounded on the lower surface by a permeable membrane 12 (e.g., a RO membrane), and on the top surface by an upper surface 16. A typical micro-channel height, H, ranges from 0.1 to a few mm's. Upper surface 16 can be permeable or non-permeable surface. Process fluid (e.g., salt water) enters at the left end 14, flows from left to right through micro-channel 8 in a zig-zag path around the micro-mixers, eventually exiting at the right end 15. A portion (17) of the process fluid permeates through the permeable membrane 12. Micro-mixers 10, 10', 11, 11' can be disposed only on the lower membrane surface 12; or only on the upper surface 16; or to both. Micro-mixers 10, 10', 11, 11' function as fixed 'posts' or 'spacers' or 'vanes', and have a long-axis that is oriented generally perpendicular to surfaces 12 and 16. The micro-mixers can also serve to separate the upper and lower surfaces.

Figure 3:
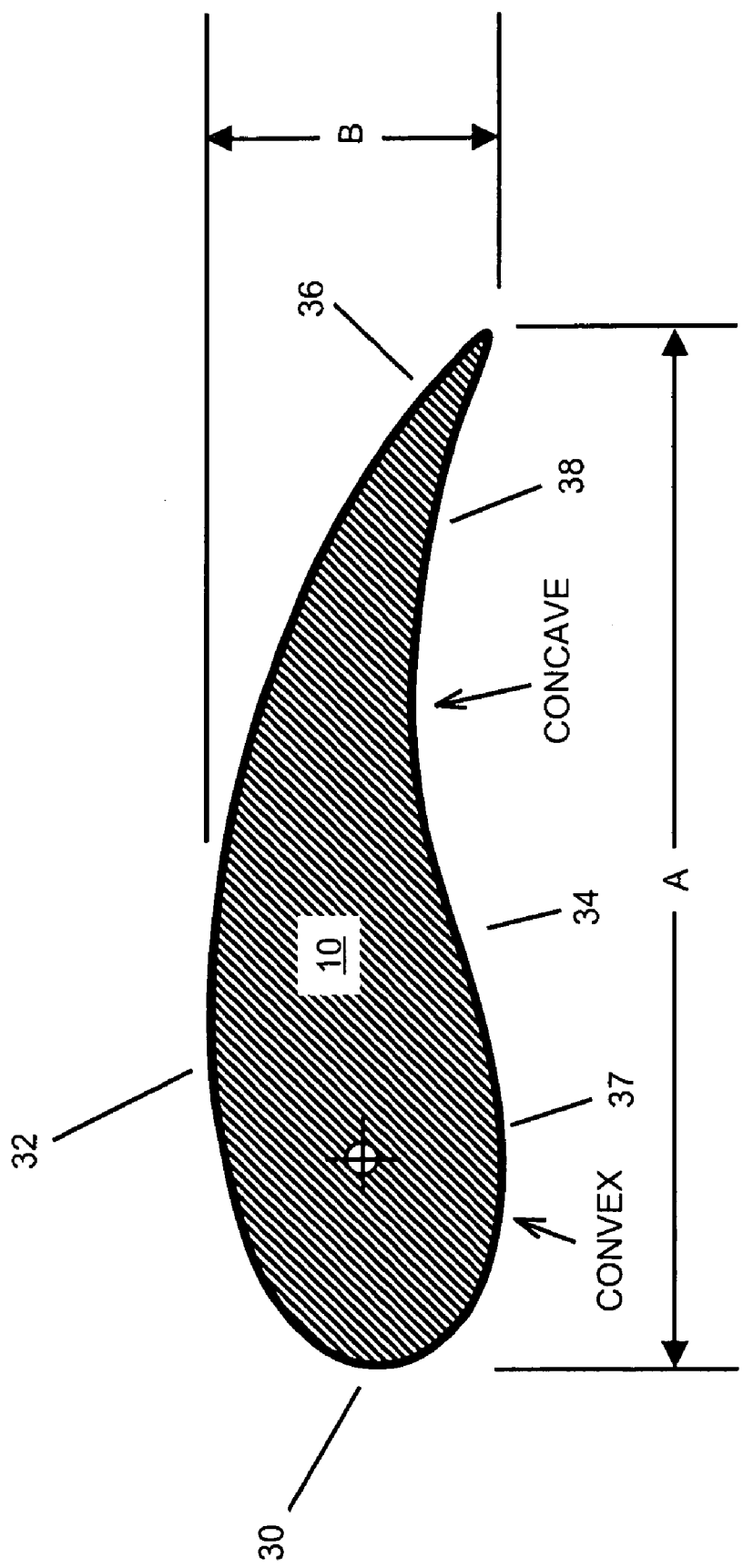
FIG. 3 shows a cross-section view from the top of an airfoil-shaped micro-mixer.

FIG. 3 shows a cross-section view from the top of an example of an airfoil-shaped micro-mixer 10. Micro-mixer 10 has a cross-sectional shape of an airfoil, with a overall length=A and an overall width=B; and comprises a rounded nose leading edge 30, a cambered upper surface 32, a tapered trailing edge 36, and a curved lower surface 34. Lower surface 34 can be "S"-shaped, as shown in FIG. 3, comprising a convex-shaped forward section 37 and a concave-shaped (i.e., "under-cambered") rear section 38.

An airfoil shape for the micro-mixers most efficiently minimizes flow resistance (i.e. 'drag'), as compared to a simple cylindrical shape (which has a high drag resistance), while serving to change the direction and magnitude of the fluid flow velocity vectors; thereby promoting mixing and reducing fouling. Typical dimensions of lengths "A" and "B" are 0.1 to a few mm's.

In this specification, the use of the word "airfoil" means any cross-sectional shape of a micro-mixer post or vane that has a rounded leading edge, a tapered trailing edge, and an aspect ratio that is generally longer in the "A" dimension than it's overall width "B". The rounded leading edge of the airfoil-shaped micro-mixer is oriented upstream, and the tapered trailing edge oriented downstream, of the direction of fluid flow.

In other embodiments, the aspect ratio, A/B, of the airfoil-shaped micro-mixers can be greater than or equal to 2, and less than or equal to 4.

Figure 4:
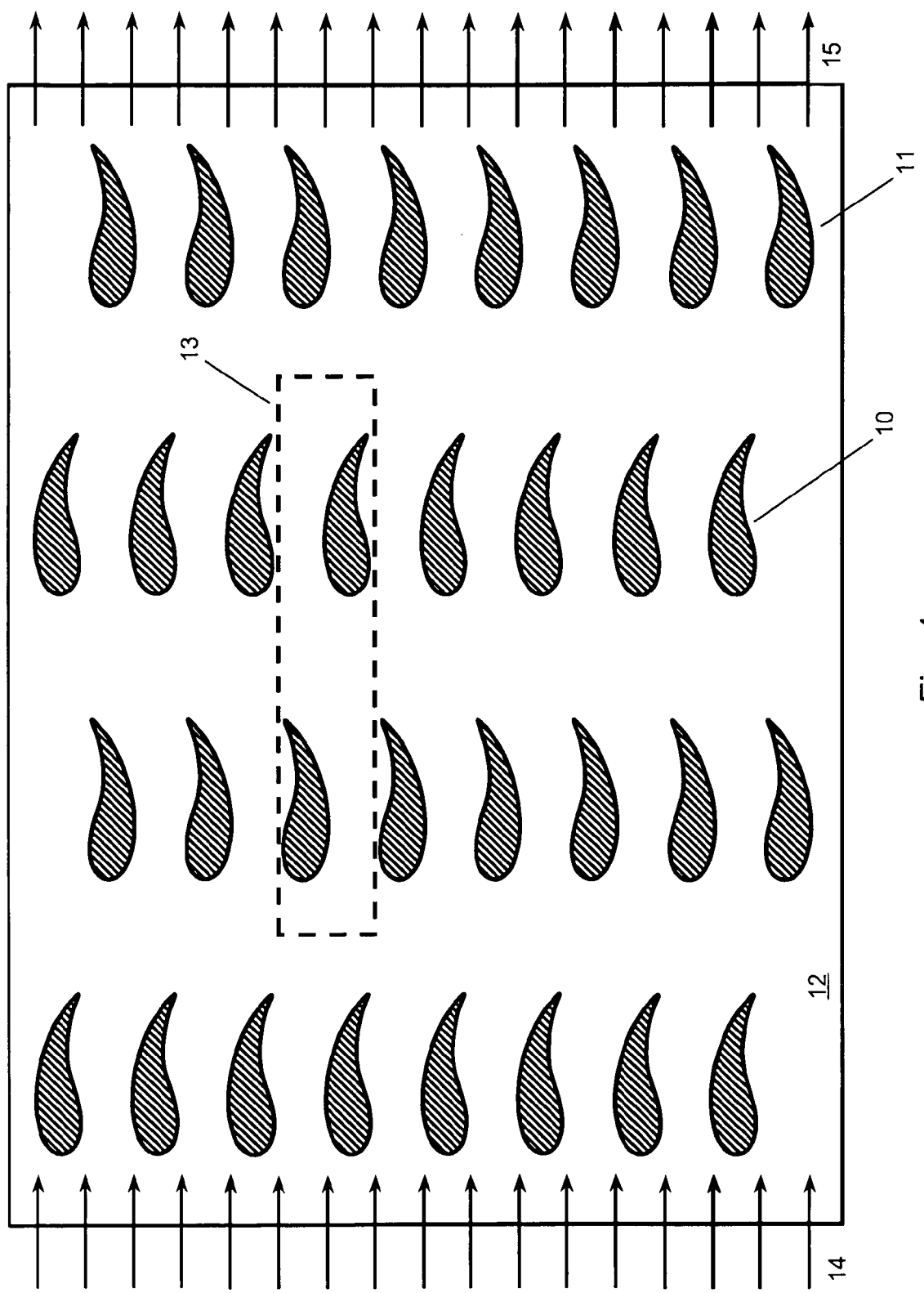
FIG. 4 shows a schematic top view of a staggered array of airfoil-shaped micro-mixers disposed on a substrate.

FIG. 4 shows a schematic top view of a staggered array of airfoil-shaped micro-mixers 10, 11; disposed on permeable membrane substrate 12. The dashed-line box 13 represents a basic unit "cell", which is repeated throughout the periodic array of rows and columns of micro-mixers 10,11. In this example, every other column of micro-mixers (i.e., $2^{nd}$, $4^{th}$, and so on) is staggered (i.e., offset) from the adjacent column; and the orientation of the airfoil shapes is flipped upside-down from the orientation of the airfoil shapes in the adjacent columns.

FIG. 5 shows a schematic top view of a staggered array of airfoil-shaped micro-mixers 10, 11; disposed on permeable membrane substrate 12. Each column of micro-mixers is spaced apart by a separation distance, S, along the flow direction; and every other row of micro-mixers is offset, in a direction perpendicular to the flow direction, from the previous row by a row offset distance=d. In this example, the separation distance S is equal to about twice the length, A, of the micro-mixer (see FIG. 3); and the offset distance 'd' is equal to about the 1.5 times the width, B, of the micro-mixer (see FIG. 3).

In other embodiments, the row offset distance, d, may be greater than or equal to 1 times B and less than or equal to 5 times B.

FIG. 6 shows a schematic top view of a staggered array of airfoil-shaped micro-mixers 10, 11; disposed on permeable membrane substrate 12. In this example, the angle of attack, theta, of each micro-mixer has been increased from zero in the previous examples to about +20 degrees of positive pitch with respect to the direction of the incoming fluid. (Note: the flipped-over airfoils 11 and 11' are rotated in the opposite direction from the first and third columns of airfoils 10 and 10'.) Although generating lift is not a required feature of this design, changes in the airfoil's angle of attack affects the tradeoff between increasing the scouring effect versus increasing the pressure drop along the micro-channel.

FIG. 7 is the same as FIG. 6, except that the airfoils have been rotated with a negative angle of attack, i.e., to about −20 degrees of pitch with respect to the direction of the incoming fluid.

In other embodiments, the angle of attack, theta, of each micro-mixer may range from +30 degrees to −30 degrees of attack.

Figure 8:
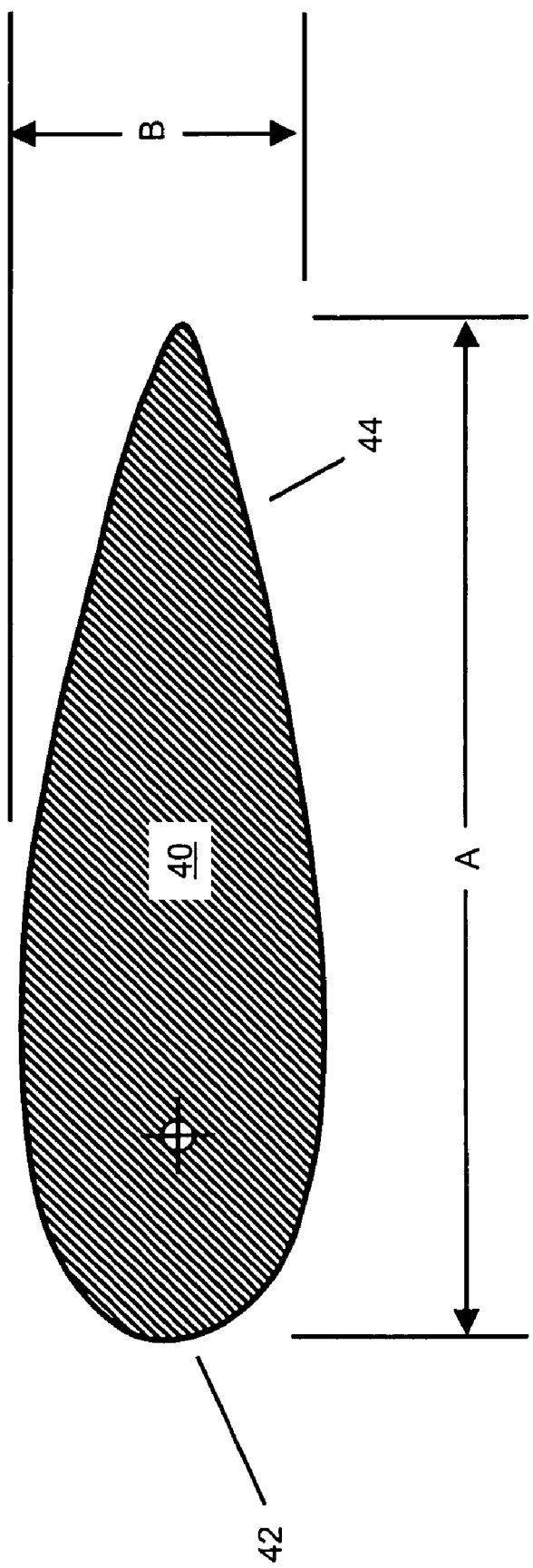
FIG. 8 shows a cross-section view from the top of an airfoil-shaped micro-mixer.

FIG. 8 shows a cross-section view from the top of an airfoil-shaped micro-mixer 40. This example shows a symmetric airfoil shape (i.e., teardrop), having a rounded leading edge 42 and a tapered trailing edge 44.

FIG. 9 shows a schematic top view of a staggered array of symmetrically-shaped airfoil-shaped micro-mixers 10, 11; disposed on permeable membrane substrate 12. In this example, the angle of attack, theta, of each micro-mixer has been increased from zero in the previous examples to about +20 degrees of positive pitch with respect to the direction of the incoming fluid. (Note: the flipped-over airfoils 11 and 11' are rotated in the opposite direction from the first and third columns of airfoils 10 and 10'.)

Figure 10:
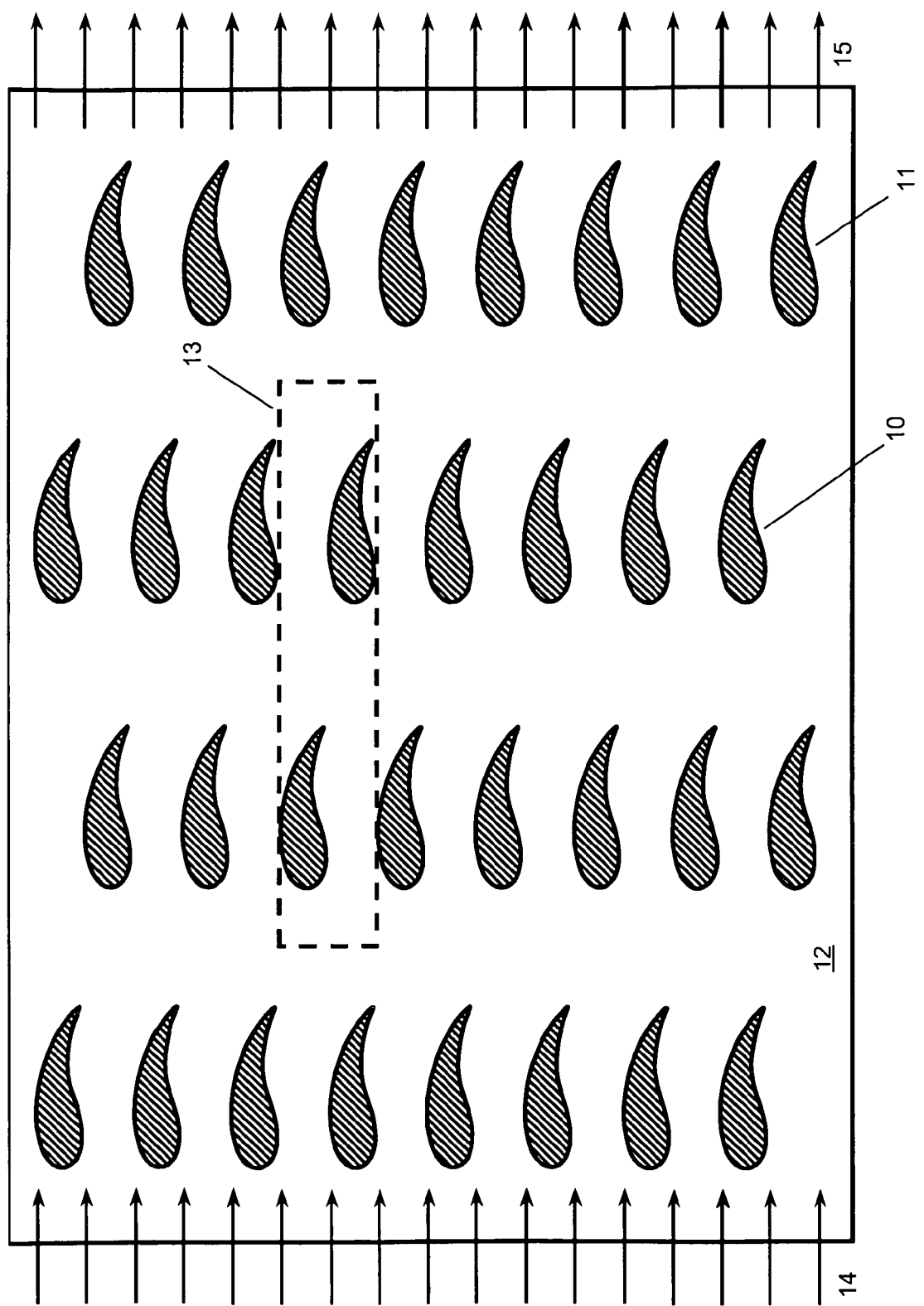
FIG. 10 shows a schematic top view of a staggered array of airfoil-shaped micro-mixers disposed on a substrate.

FIG. 10 shows a schematic top view of a staggered array of airfoil-shaped micro-mixers 10, 11; disposed on permeable membrane substrate 12. The dashed-line box 13 represents a basic unit "cell", which is repeated throughout the periodic array of micro-mixers 10,11. In this example, every other column of micro-mixers (i.e., $2^{nd}$, $4^{th}$, and so on) is staggered (i.e., offset) from the adjacent column.

Figure 11:
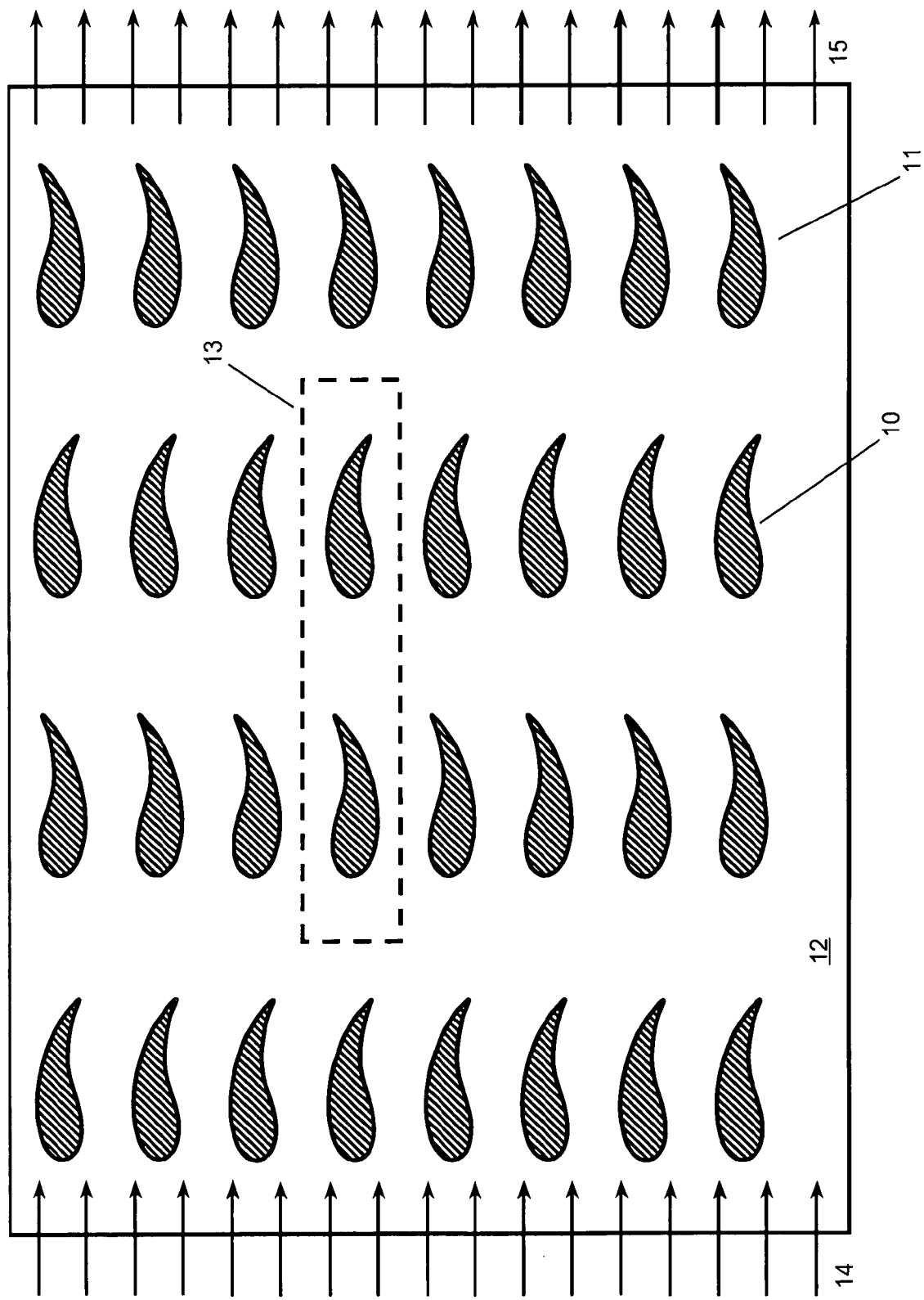
FIG. 11 shows a schematic top view of a non-staggered array of airfoil-shaped micro-mixers disposed on a substrate.

FIG. 11 shows a schematic top view of a staggered array of airfoil-shaped micro-mixers 10, 11; disposed on permeable membrane substrate 12. The dashed-line box 13 represents a basic unit "cell", which is repeated throughout the periodic array of micro-mixers 10,11. In this example, there is zero amount of offset between columns; and every other column of micro-mixers (i.e., $2^{nd}$, $4^{th}$, and so on) the orientation of the airfoil shapes is flipped upside-down from the orientation of the airfoil shapes in the adjacent columns.

Figure 12:
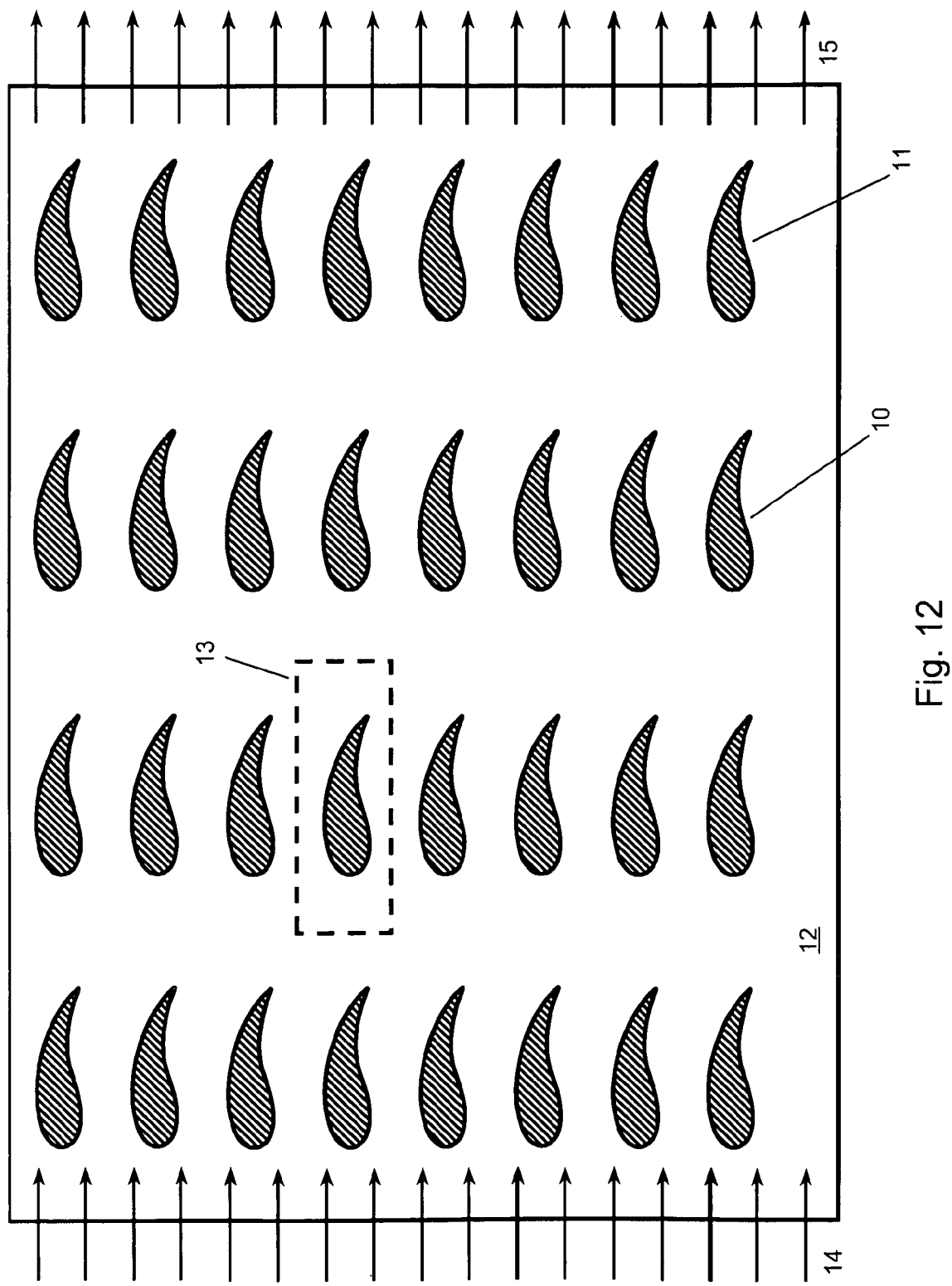
FIG. 12 shows a schematic top view of a non-staggered array of airfoil-shaped micro-mixers disposed on a substrate.

FIG. 12 shows a schematic top view of a staggered array of airfoil-shaped micro-mixers 10, 11; disposed on permeable membrane substrate 12. The dashed-line box 13 represents a basic unit "cell", which is repeated throughout the periodic array of micro-mixers 10,11. In this example, there is zero amount of offset between columns; and every other column of micro-mixers (i.e., $2^{nd}$, $4^{th}$, and so on) the orientation of the airfoil shapes is the same in all of the columns.

Figure 13:
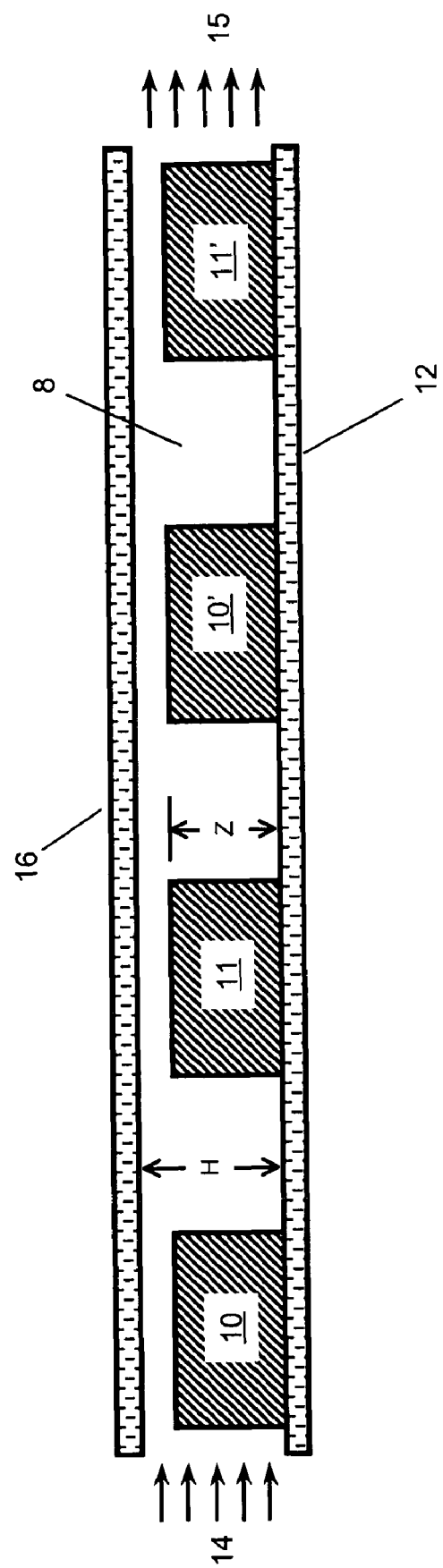
FIG. 13 shows a schematic side view of a staggered array of airfoil-shaped micro-mixers within a micro-channel.

FIG. 13 shows a schematic side view of a staggered array of airfoil-shaped micro-mixers within a micro-channel. In this example, the vertical height, z, of the micro-mixers is less than the vertical height, H, of the micro-channel 8. Also, in this example, both the lower surface 12 and the upper surface 16 comprise permeable membranes, although the micro-mixers are only disposed on the lower surface 12. The vertical height, z, can range from greater than or equal to 0.1 mm to less than or equal to 3 mm.

Figure 14:
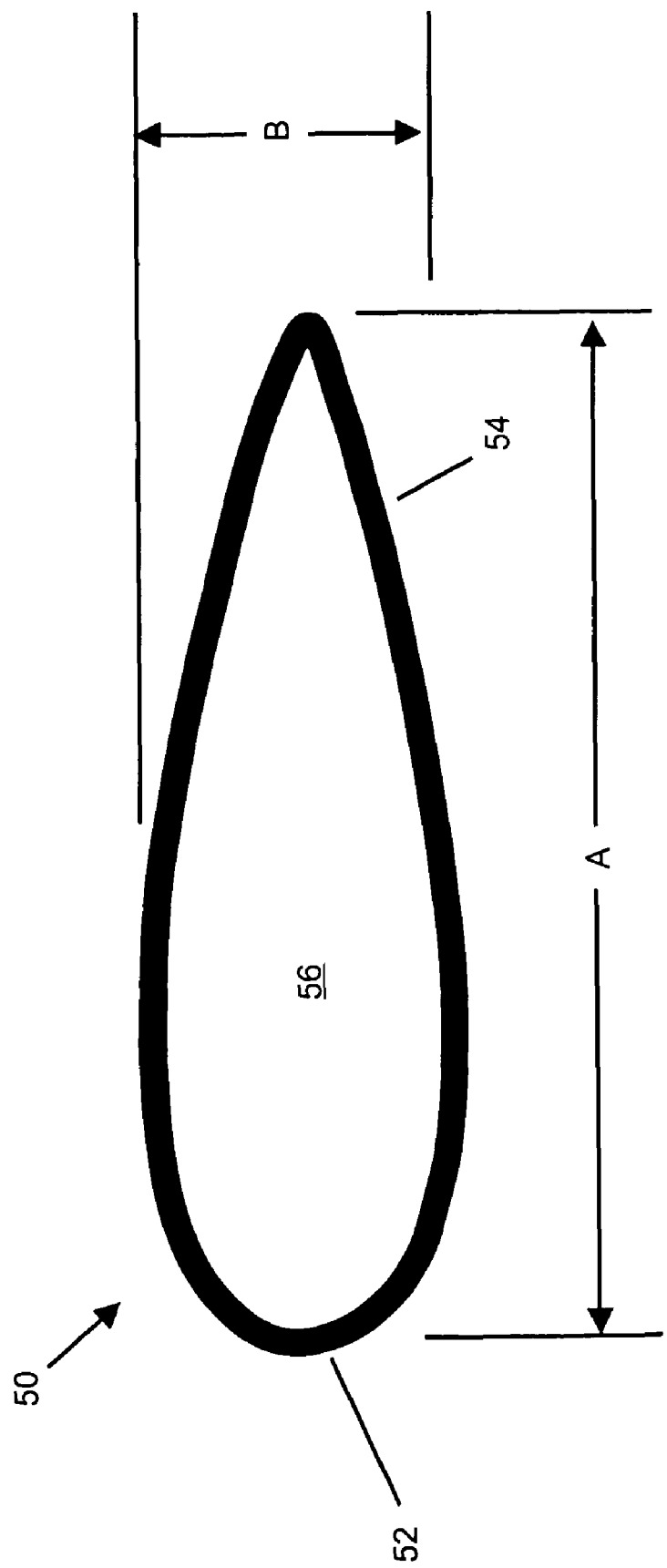
FIG. 14 shows a cross-section view from the top of a hollow airfoil-shaped micro-mixer.

FIG. 14 shows a cross-section view from the top of a hollow, thick-walled, symmetric airfoil-shaped micro-mixer 50, with a rounded leading edge 52, a tapered trailing edge 54, and a hollow interior space 56. The wall thickness can be, for example, about 0.1-0.3 mm thick; depending on the fabrication technique used.

Figure 15:
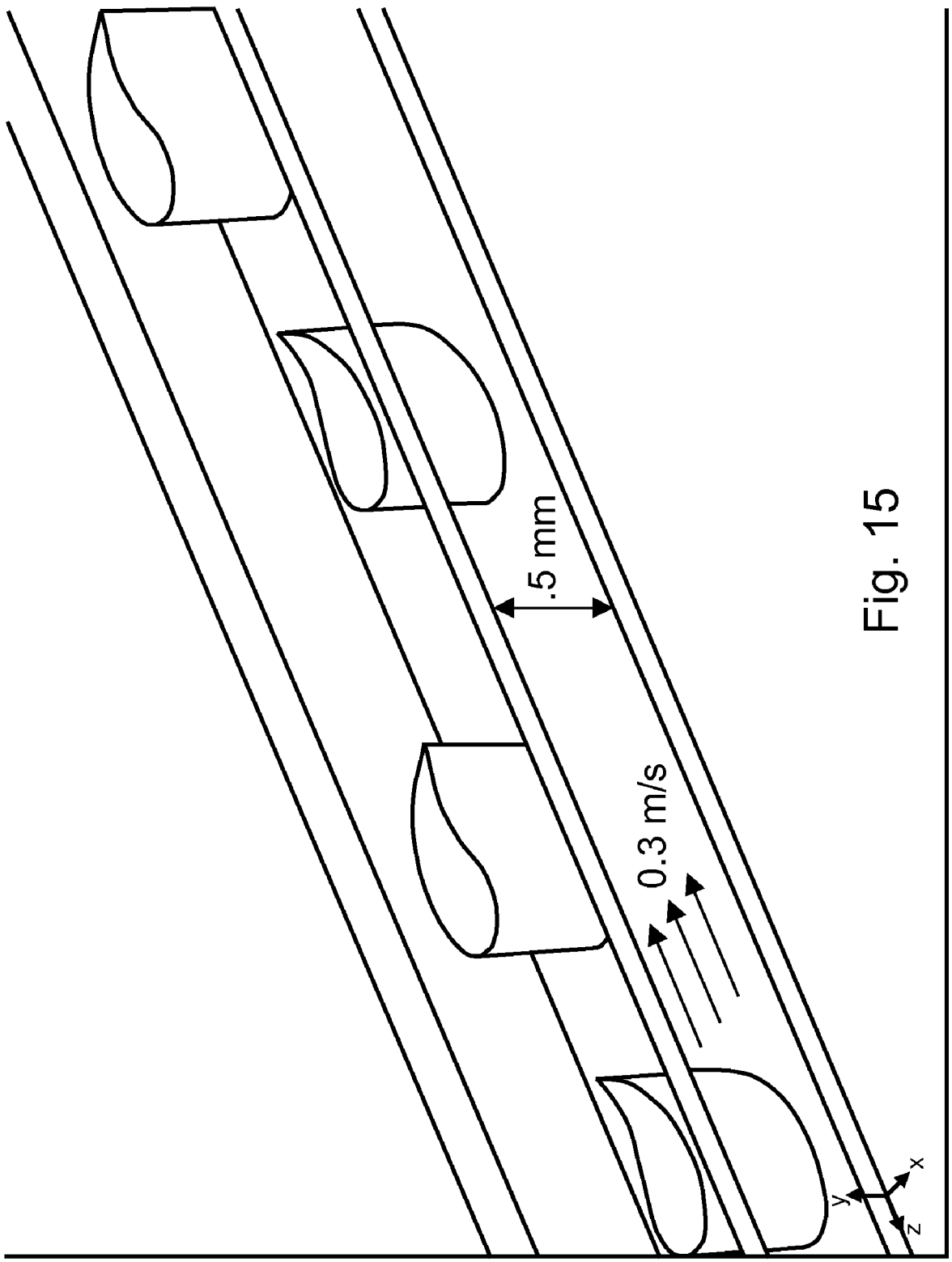
FIG. 15 shows a 3-D model of staggered airfoil-shaped micro-mixers used for a CFD calculation (computational fluid dynamics).
Figure 16:
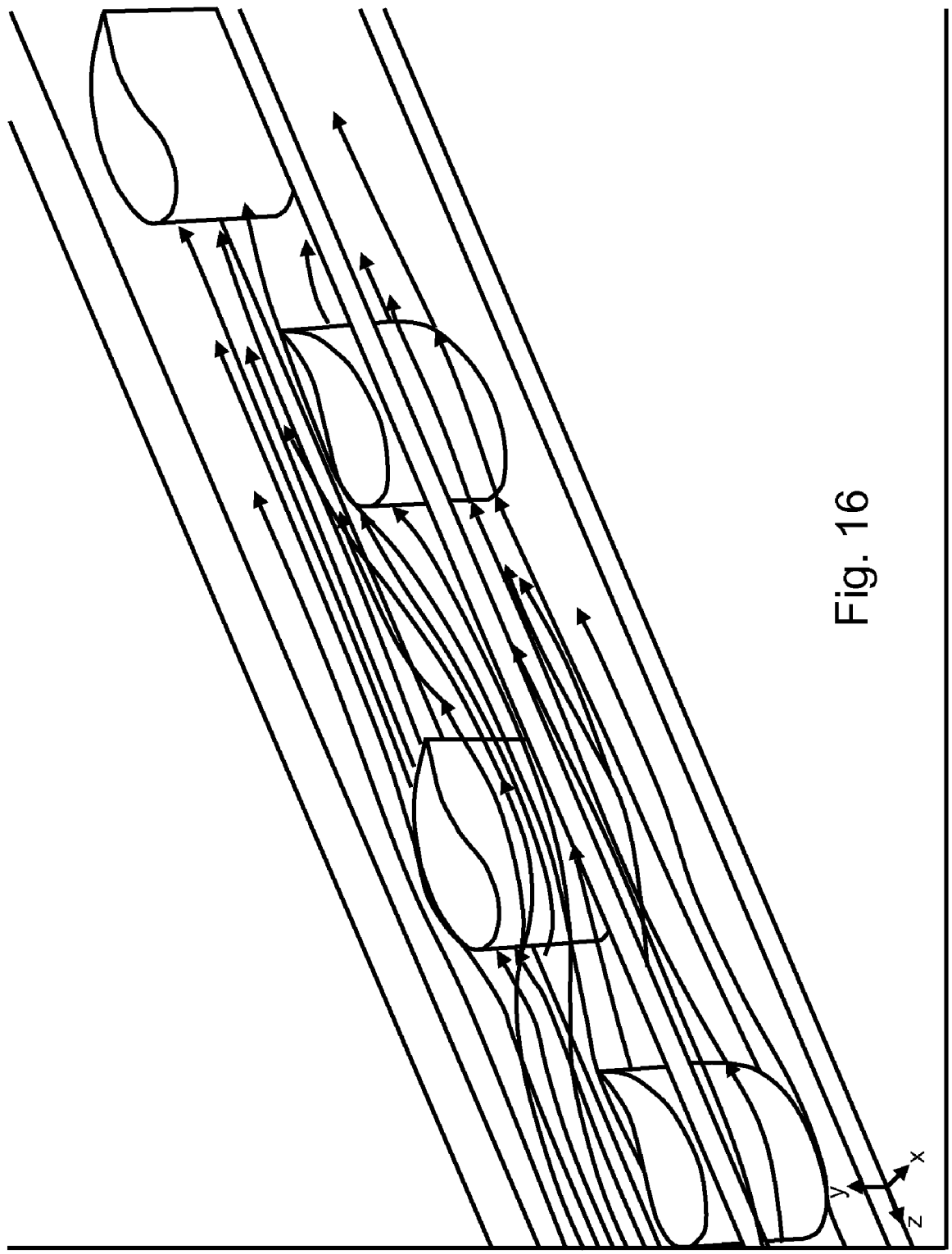
FIG. 16 shows a snapshot of flow streamlines from the CFD calculation.

FIG. 15 shows a 3-D model of staggered airfoil-shaped micro-mixers used for a CFD calculation (computational fluid dynamics). FIG. 16 shows a snapshot of flow streamlines from the CFD calculation.

Figure 17:
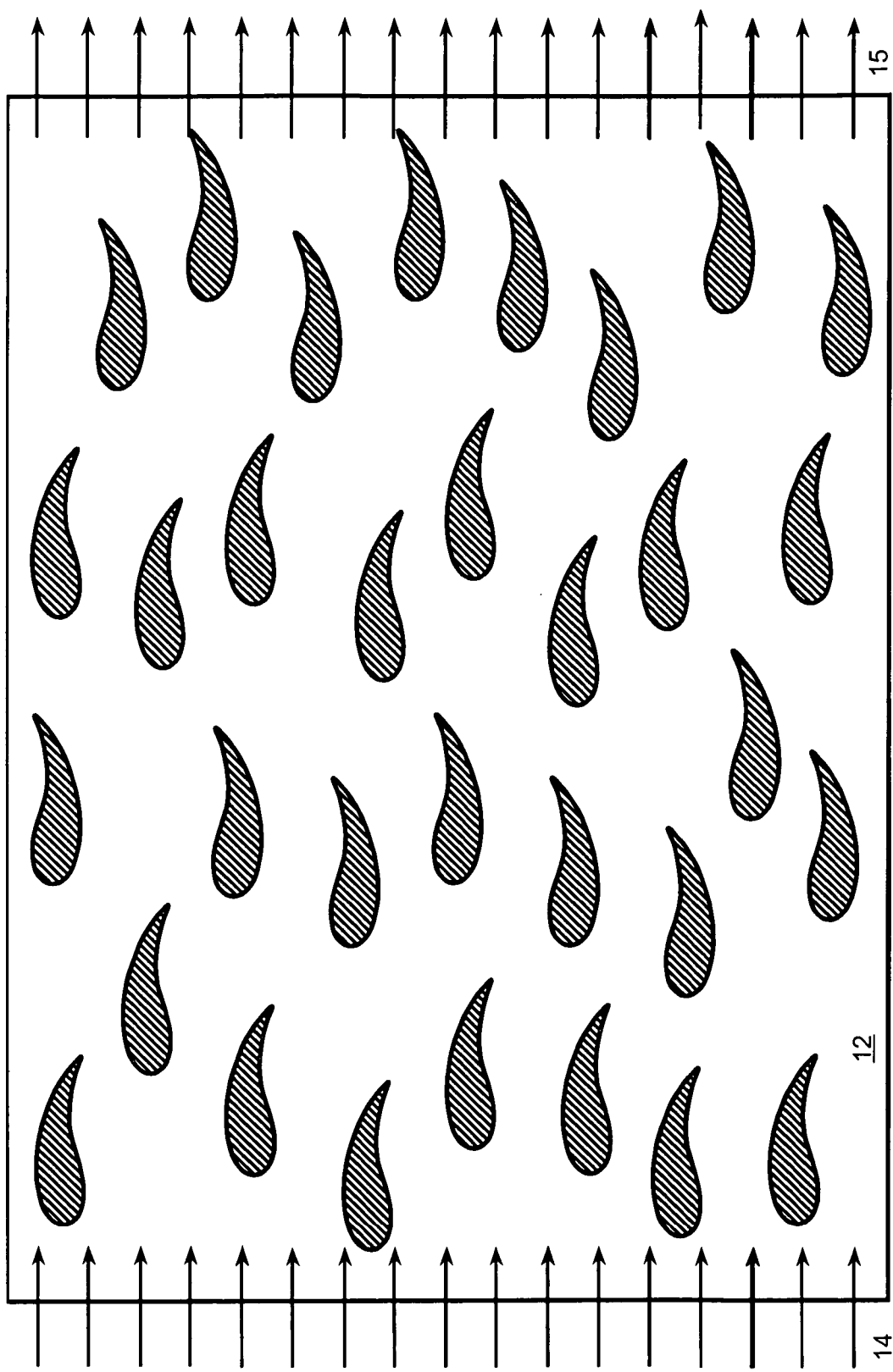
FIG. 17 shows an irregular pattern of airfoil-shaped micro-mixers.

FIG. 17 shows an irregular pattern of airfoil-shaped micro-mixers. Such an irregular pattern may increase the amount of chaotic flow, thereby increasing the scouring effect and reducing fouling.

It will be appreciated that other, well-known, airfoil shapes may be used instead of the specific examples listed above. Also, it will be appreciated that the array of micro-mixers can comprise combinations of the various shapes and patterns described earlier, such as (but, not limited to): combinations of different sized airfoils (big/small); combinations of different angles of attacks (including positive and negative angles); combinations of different shaped airfoils (symmetric/asymmetric), etc.

The airfoil-shaped micro-mixers described above may be made of plastic, ceramic, oxide, metal, composites, or other material, by using a variety of fabrication techniques. The micro-mixers can be fabricated separately and then bonded, glued, or otherwise attached to the permeable membrane. Alternatively, the micro-mixers may be embossed into/out of the membrane itself. Alternatively, the micro-mixers can be fabricated by directly depositing material (e.g., liquid polymer) onto the membrane's surface by a direct deposition technique (e.g., microprinting, micromolded, microcasting/robocasting, micro-stamping, micro-contact printing). Lithographic fabrication techniques may also be used (e.g., soft lithography-based microfluidics fabrication techniques; based, for example, on polydimethylsiloxane (PDMS) or polymethylmethacrylate (PMMA)).

Prototype micro-mixer designs were printed on reverse-osmosis membranes using a robotic syringe-dispense method (Robocasting) developed at the Advanced Materials Laboratory at Sandia. A UV-curable epoxy (Masterbond UVTK15) was printed directly on the RO membranes and UV cured for 5 minutes at room temperature to develop bio-inert micro-mixer patterns.

Biocidal coatings have also been developed that can be applied to the membrane surfaces and the exposed surfaces of the mixmomixers that still allow permeate flux, while reducing the attachment of fouling agents and contaminants. The coatings can be acid-functionalized polyphenylenes and polysulfones to make chlorine and biofouling resistant membranes. Self-assembled monolayers such as silanes can also be used. Silver and copper nanoparticles are also proven antimicrobial agents that can be deposited on the membranes and micro-mixers. Generally, only very thin coatings will be required to minimize biofouling either by electrostatic repulsion of microorganisms (for the acid functionalized coatings) or by direct biocidal mechanisms (for the coatings with quaternary ammonium groups).

In other embodiments, the micro-mixers can be fabricated from a sacrificial material that can be removed after the spiral wound membrane is assembled. For example, water-soluble (or other chemically soluble) materials can be used to fabricate the micro-mixers, and water (or another solvent) can be used to dissolve the sacrificial micro-mixers following assembly. Other suitable methods of removing the sacrificial micro-mixers can also be used (e.g., heating, photolithography). Various designs for the sacrificial micro-mixers can be employed such as longitudinal or horizontal lines, cross-hatching, or isolated protrusions (posts, chevrons, etc.). The sacrificial spacers can be inserted as a separate material, applied (e.g., sprayed, printed, rolled, stamped) onto the membrane surface directly, or created from the membrane itself (e.g., embossed). The sacrifical material can be a water-soluble polymer or any other chemically soluble material that can be dissolved by a solvent that will not harm the membrane. The sacrificial material could be comprised of a heat-sensitive material that when exposed to slightly elevated temperatures (either from warm water, air, or other solvent), the dissolution or removal is accelerated. In addition, the sacrificial material can be comprised of particles (e.g., silver, copper) or compounds that when released or dissolved acts to mitigate fouling of the membrane from microbes or other organic or inorganic compounds. The sacrificial micro-mixers material could be deliberately designed to be a "time released" substance that releases these anti-fouling agents (either by chemical reactions or scouring, say, from particulates) throughout the operation of the membrane module.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

What is claimed is:

1. An array of airfoil-shaped micro-mixers disposed on a surface of a permeable membrane, wherein: the airfoil shape has a rounded leading edge and a tapered trailing edge; an overall length=A and an overall width=B; and the leading edge is oriented upstream and the trailing edge is oriented downstream of fluid flowing along the membrane's surface in a direction of fluid flow;

wherein the micro-mixers and the permeable membrane comprise a biocidal/germicidal agent that reduces fouling.

2. The array of micro-mixers of claim 1, wherein the micro-mixer height is greater than or equal to 0.1 mm and less than or equal to 3 mm.

3. The array of micro-mixers of claim 1, wherein permeable membrane comprises a reverse osmosis membrane.

4. The array of micro-mixers of claim 1, wherein the airfoil shape has a "S"-shaped lower surface, consisting of a convex-curved forward section and a concave-curved rear section.

5. The array of micro-mixers of claim 1, wherein the array comprises regular rows and columns of micro-mixers; and every other column of micro-mixers is offset in a direction perpendicular to the flow direction from the adjacent column by a row offset distance=d; and wherein adjacent columns of micro-mixers are spaced apart, along the direction of flow, by a separation distance, S; and wherein the orientation of the airfoil shapes in every other column is flipped upside-down from the orientation of the airfoil shapes in adjacent columns.

6. The array of micro-mixers of claim 5, wherein the separation distance, S, equals 2 times the length, A, of the airfoil shape; and the row offset distance, d, is equal to 1.5 times the width, B, of the airfoil shape.

7. The array of micro-mixers of claim 1, wherein each micro-mixer airfoil has a positive angle of attack, with respect to the direction of fluid flow, that is greater than zero and less than 30 degrees.

8. The array of micro-mixers of claim 1, wherein each micro-mixer airfoil has a negative angle of attack, with respect to the direction of fluid flow, that is greater than zero and less than 30 degrees.

9. The array of micro-mixers of claim 1, wherein the airfoil shape is a symmetric, teardrop shape.

10. The array of micro-mixers of claim 1, wherein the aspect ratio, A/B, of the airfoil shape is between 2 and 4.

11. The array of micro-mixers of claim 1, wherein the array comprises regular rows and columns of micro-mixers; and every other column of micro-mixers is offset in a direction perpendicular to the flow direction from the adjacent column by a row offset distance=d; and wherein adjacent columns of micro-mixers are spaced apart, along the direction of flow, by a separation distance, S.

12. The array of micro-mixers of claim 11, wherein the row offset distance, d=0.

13. The array of micro-mixers of claim 12, wherein the orientation of the airfoil shapes in every other column is flipped upside-down from the orientation of the airfoil shapes in adjacent columns.

14. The array of micro-mixers of claim 1, wherein the micro-mixers have a solid, filled cross-section.

15. The array of micro-mixers of claim 1, wherein the micro-mixers have a hollow cross-section.

16. The array of micro-mixers of claim 15, wherein the hollow micro-mixers have a wall thickness from 0.1 to 0.3 mm thick.

17. The array of micro-mixers of claim 1, wherein the distribution of micro-mixers in the array is irregularly-spaced.

18. The array of micro-mixers of claim 1, wherein the micro-mixers are made out of a UV-curable epoxy material directly printed onto a reverse osmosis membrane.

19. The array of micro-mixers of claim 1, wherein the biocidal/germicidal agent is selected from the group consisting of acid-functionalized polyphenylenes and polysulfones, coatings with quaternary ammonium groups, self-assembled monolayers of silane, and copper and silver nanoparticles.

20. The array of micro-mixers of claim 1, wherein the biocidal/germicidal agent is selected from the group consisting of copper and silver nanoparticles.

21. The array of micro-mixers of claim 1, wherein the micro-mixers comprise a water-soluble material containing at least one biocidal/germicidal agent, capable of being released when exposed to water during use.

22. An array of airfoil-shaped micro-mixers disposed on a surface of a permeable membrane, wherein:
   the airfoil shape has a rounded leading edge and a tapered trailing edge; an overall length=A and an overall width=B; and the leading edge is oriented upstream and the trailing edge is oriented downstream of fluid flowing along the membrane's surface in a direction of fluid flow;
   the micro-mixer height is greater than or equal to 0.1 mm and less than or equal to 3 mm;
   the permeable membrane comprises a reverse osmosis membrane;
   the airfoil shape has a "S"-shaped lower surface, consisting of a convex-curved forward section and a concave-curved rear section;
   the array comprises regular rows and columns of micro-mixers; and every other column of micro-mixers is offset in a direction perpendicular to the flow direction from the adjacent column by a row offset distance=d; and wherein adjacent columns of micro-mixers are spaced apart, along the direction of flow, by a separation distance, S; and wherein the orientation of the airfoil shapes in every other column is flipped upside-down from the orientation of the airfoil shapes in adjacent columns;
   the separation distance, S, equals 2 times the length, A, of the airfoil shape; and the row offset distance, d, is equal to 1.5 times the width, B, of the airfoil shape; and
   the aspect ratio, A/B, of the airfoil shape is between 2 and 4;
   and wherein the micro-mixers and the permeable membrane are coated with a biocidal/germicidal coating that reduces fouling.

23. An array of airfoil-shaped micro-mixers disposed on a surface of a permeable membrane, wherein: the airfoil shape has a rounded leading edge and a tapered trailing edge; an overall length=A and an overall width=B; and the leading edge is oriented upstream and the trailing edge is oriented downstream of fluid flowing along the membrane's surface in a direction of fluid flow;
wherein the micro-mixers have a hollow cross-section.

* * * * *